US009347381B2

(12) United States Patent
Long et al.

(10) Patent No.: US 9,347,381 B2
(45) Date of Patent: May 24, 2016

(54) MODEL PREDICTIVE CONTROL SYSTEMS AND METHODS FOR INTERNAL COMBUSTION ENGINES

(71) Applicant: GM Global Technology Operations LLC, Detroit, MI (US)

(72) Inventors: Ruixing Long, Oshawa (CA); Gary Robert Cygan, Jr., Auburn Hills, MI (US); Julian R. Verdejo, Farmington, MI (US); Christopher E. Whitney, Commerce, MI (US); Ning Jin, Novi, MI (US); Alberto Bemporad, Lucca (IT); Daniele Bernardini, Siena (IT)

(73) Assignee: GM Global Technology Operations LLC, Detroit, MI (US)

( * ) Notice: Subject to any disclaimer, the term of this patent is extended or adjusted under 35 U.S.C. 154(b) by 245 days.

(21) Appl. No.: 14/225,502

(22) Filed: Mar. 26, 2014

(65) Prior Publication Data

US 2015/0275772 A1    Oct. 1, 2015

(51) Int. Cl.
| F02D 11/10 | (2006.01) |
| F02D 9/02 | (2006.01) |
| F02D 13/02 | (2006.01) |
| F02D 21/04 | (2006.01) |
| F02D 23/00 | (2006.01) |
| F02B 37/12 | (2006.01) |

(52) U.S. Cl.
CPC . *F02D 9/02* (2013.01); *F02B 37/12* (2013.01); *F02D 13/02* (2013.01); *F02D 21/04* (2013.01); *F02D 23/00* (2013.01); *F02D 2009/0235* (2013.01)

(58) Field of Classification Search
CPC . F02D 11/10; F02D 11/105; F02D 2011/102; F02D 41/0002; F02D 2250/18; F02D 9/02; F02D 2009/0235; F02B 37/12

USPC ......... 123/436, 399; 701/103, 110; 73/114.15
See application file for complete search history.

(56) References Cited

U.S. PATENT DOCUMENTS 4,161,929 A    7/1979  Nohira et al.
5,101,786 A    4/1992  Kamio et al.
(Continued)

FOREIGN PATENT DOCUMENTS

CN    1594846 A    3/2005
WO    WO-03-065135 A1    8/2003

OTHER PUBLICATIONS

U.S. Appl. No. 14/309,047, filed Jun. 19, 2014, Jose C. Zavala Jurado et al.
John C. G. Boot; "Quadratic Programming: Algorithms, Anomalies, Applications vol. 2 of Studies in mathematical and managerial economics"; North-Holland Publ.Comp., 1964; 213 pages.
N. Lawrence Ricker; "Use of quadratic programming for constrained internal model control"; Ind. Eng. Chem. Process Des. Dev., 1985, pp. 925-936.

(Continued)

*Primary Examiner* — Hai Huynh

(57) ABSTRACT

An engine control method includes: generating a first predicted engine output torque and a first predicted mass of air per cylinder (APC) based on a model of the spark ignition engine and a first set of possible target values determined based on an engine torque request; generating a second predicted engine output torque and a second predicted mass of APC based on the model of the spark ignition engine and a second set of possible target values determined based on the engine torque request; determining a first cost for the first set of possible target values; determining a second cost for the second set of possible target values; selecting one of the first and second sets based on the first and second costs; and setting target values based on the possible target values of the selected one of the first and second sets.

20 Claims, 4 Drawing Sheets

(56) References Cited

U.S. PATENT DOCUMENTS

| | | | |
|---|---|---|---|
| 5,706,780 | A | 1/1998 | Shirakawa |
| 5,727,528 | A | 3/1998 | Hori et al. |
| 5,775,293 | A | 7/1998 | Kresse |
| 5,921,219 | A | 7/1999 | Frohlich et al. |
| 6,014,955 | A | 1/2000 | Hosotani et al. |
| 6,155,230 | A | 12/2000 | Iwano et al. |
| 6,532,935 | B2 | 3/2003 | Ganser et al. |
| 6,606,981 | B2 | 8/2003 | Itoyama |
| 6,704,638 | B2 | 3/2004 | Livshiz et al. |
| 6,826,904 | B2 | 12/2004 | Miura |
| 6,840,215 | B1 | 1/2005 | Livshiz et al. |
| 7,016,779 | B2 | 3/2006 | Bowyer |
| 7,021,282 | B1 | 4/2006 | Livshiz et al. |
| 7,051,058 | B2 | 5/2006 | Wagner et al. |
| 7,274,986 | B1 | 9/2007 | Petridis et al. |
| 7,395,147 | B2 | 7/2008 | Livshiz et al. |
| 7,400,967 | B2 | 7/2008 | Ueno et al. |
| 7,433,775 | B2 | 10/2008 | Livshiz et al. |
| 7,441,544 | B2 | 10/2008 | Hagari |
| 7,614,384 | B2 | 11/2009 | Livshiz et al. |
| 7,703,439 | B2 | 4/2010 | Russell et al. |
| 7,715,975 | B2 | 5/2010 | Yamaoka et al. |
| 7,775,195 | B2 | 8/2010 | Schondorf et al. |
| 7,813,869 | B2 | 10/2010 | Grichnik et al. |
| 7,885,756 | B2 | 2/2011 | Livshiz et al. |
| 7,941,260 | B2 | 5/2011 | Lee et al. |
| 7,967,720 | B2 | 6/2011 | Martin et al. |
| 8,041,487 | B2 | 10/2011 | Worthing et al. |
| 8,050,841 | B2 | 11/2011 | Costin et al. |
| 8,073,610 | B2 | 12/2011 | Heap et al. |
| 8,103,425 | B2 | 1/2012 | Choi et al. |
| 8,103,428 | B2 | 1/2012 | Russ et al. |
| 8,116,954 | B2 | 2/2012 | Livshiz et al. |
| 8,176,735 | B2 | 5/2012 | Komatsu |
| 8,307,814 | B2 | 11/2012 | Leroy et al. |
| 8,447,492 | B2 | 5/2013 | Watanabe et al. |
| 8,468,821 | B2 | 6/2013 | Liu et al. |
| 8,483,935 | B2 | 7/2013 | Whitney et al. |
| 8,739,766 | B2 | 6/2014 | Jentz et al. |
| 8,862,248 | B2 | 10/2014 | Yasui |
| 8,954,257 | B2 | 2/2015 | Livshiz et al. |
| 9,062,631 | B2 | 6/2015 | Kinugawa et al. |
| 9,075,406 | B2 | 7/2015 | Nakada |
| 9,145,841 | B2 | 9/2015 | Miyazaki et al. |
| 9,175,628 | B2 | 11/2015 | Livshiz et al. |
| 2002/0038647 | A1 | 4/2002 | Tashiro et al. |
| 2003/0074892 | A1 | 4/2003 | Miura |
| 2003/0110760 | A1 | 6/2003 | Shirakawa |
| 2003/0145836 | A1 | 8/2003 | Linna et al. |
| 2004/0116220 | A1 | 6/2004 | Yamamoto et al. |
| 2005/0065691 | A1 | 3/2005 | Cho |
| 2005/0131620 | A1 | 6/2005 | Bowyer |
| 2005/0171670 | A1 | 8/2005 | Yoshioka et al. |
| 2006/0199699 | A1 | 9/2006 | Berglund et al. |
| 2007/0174003 | A1 | 7/2007 | Ueno et al. |
| 2008/0271718 | A1 | 11/2008 | Schondorf et al. |
| 2008/0308066 | A1 | 12/2008 | Martin et al. |
| 2009/0018733 | A1 | 1/2009 | Livshiz et al. |
| 2009/0033264 | A1 | 2/2009 | Falkenstein |
| 2009/0037066 | A1 | 2/2009 | Kuwahara et al. |
| 2009/0037073 | A1 | 2/2009 | Jung et al. |
| 2009/0118968 | A1 | 5/2009 | Livshiz et al. |
| 2009/0118969 | A1 | 5/2009 | Heap et al. |
| 2009/0118972 | A1 | 5/2009 | Baur et al. |
| 2009/0143959 | A1 | 6/2009 | Yamaoka et al. |
| 2009/0229562 | A1 | 9/2009 | Ramappan et al. |
| 2009/0292435 | A1 | 11/2009 | Costin et al. |
| 2010/0049419 | A1 | 2/2010 | Yoshikawa et al. |
| 2010/0057283 | A1 | 3/2010 | Worthing et al. |
| 2010/0057329 | A1 | 3/2010 | Livshiz et al. |
| 2010/0075803 | A1 | 3/2010 | Sharples et al. |
| 2010/0116250 | A1 | 5/2010 | Simon, Jr. et al. |
| 2010/0180876 | A1 | 7/2010 | Leroy et al. |
| 2010/0211294 | A1 | 8/2010 | Soejima |
| 2010/0263627 | A1 | 10/2010 | Whitney et al. |
| 2010/0268436 | A1 | 10/2010 | Soejima et al. |
| 2010/0280738 | A1 | 11/2010 | Whitney et al. |
| 2011/0034298 | A1 | 2/2011 | Doering et al. |
| 2011/0045948 | A1 | 2/2011 | Doering et al. |
| 2011/0087421 | A1 | 4/2011 | Soejima et al. |
| 2011/0100013 | A1 | 5/2011 | Whitney et al. |
| 2011/0113773 | A1 | 5/2011 | Liu et al. |
| 2011/0144838 | A1 | 6/2011 | Matthews et al. |
| 2012/0065864 | A1 | 3/2012 | Whitney et al. |
| 2012/0150399 | A1 | 6/2012 | Kar et al. |
| 2013/0032123 | A1 | 2/2013 | Kinugawa et al. |
| 2013/0032127 | A1 | 2/2013 | Jentz et al. |
| 2013/0060448 | A1 | 3/2013 | Nakada |
| 2013/0080023 | A1 | 3/2013 | Livshiz et al. |
| 2013/0104859 | A1 | 5/2013 | Miyazaki et al. |
| 2013/0151124 | A1 | 6/2013 | Seiberlich et al. |
| 2013/0213353 | A1 | 8/2013 | Rollinger et al. |
| 2014/0076279 | A1 | 3/2014 | Livshiz et al. |
| 2014/0311446 | A1 | 10/2014 | Whitney et al. |
| 2014/0316681 | A1 | 10/2014 | Whitney et al. |
| 2014/0316682 | A1 | 10/2014 | Whitney et al. |
| 2014/0316683 | A1 | 10/2014 | Whitney et al. |
| 2015/0039206 | A1 | 2/2015 | Storch et al. |
| 2015/0275569 | A1 | 10/2015 | LeBlanc |
| 2015/0275711 | A1 | 10/2015 | Whitney et al. |
| 2015/0275771 | A1 | 10/2015 | Pochner et al. |
| 2015/0275772 | A1 | 10/2015 | Long et al. |
| 2015/0275783 | A1 | 10/2015 | Wong et al. |
| 2015/0275784 | A1 | 10/2015 | Whitney et al. |
| 2015/0275785 | A1 | 10/2015 | Cygan, Jr. et al. |
| 2015/0275786 | A1 | 10/2015 | Jin et al. |
| 2015/0275789 | A1 | 10/2015 | Cygan, Jr. et al. |
| 2015/0275792 | A1 | 10/2015 | Genslak et al. |
| 2015/0275794 | A1 | 10/2015 | Verdejo et al. |
| 2015/0275795 | A1 | 10/2015 | Cygan, Jr. et al. |
| 2015/0275796 | A1 | 10/2015 | Pochner et al. |
| 2015/0275806 | A1 | 10/2015 | Genslak et al. |

OTHER PUBLICATIONS

C. E. Lemke; "A Method of Solution for Quadratic Programs"; Rensselaer Polytechnic Institute, Troy, New York, Published Online: Jul. 1, 1962, pp. 442-453.
U.S. Appl. No. 14/675,828, filed Apr. 1, 2015, Long et al.
U.S. Appl. No. 14/675,860, filed Apr. 2001, Long et al.
U.S. Appl. No. 14/617,068, filed Feb. 9, 2015, Whitney et al.
U.S. Appl. No. 14/931,134, filed Nov. 3, 2015, Wong et al.
U.S. Appl. No. 13/613,588, filed Sep. 13, 2012, Livshiz et al.
U.S. Appl. No. 13/613,683, filed Sep. 13, 2012, Livshiz et al.
U.S. Appl. No. 13/686,069, filed Nov. 27, 2012, Livshiz et al.
U.S. Appl. No. 13/911,121, filed Jun. 6, 2013, Whitney et al.
U.S. Appl. No. 13/911,132, filed Jun. 6, 2013, Whitney et al.
U.S. Appl. No. 13/911,148, filed Jun. 6, 2013, Whitney et al.
U.S. Appl. No. 13/911,156, filed Jun. 6, 2013, Whitney et al.
U.S. Appl. No. 14/032,508, filed Sep. 20, 2013, Storch et al.
U.S. Appl. No. 14/225,492, filed Mar. 26, 2014, Wong et al.
U.S. Appl. No. 14/225,496, filed Mar. 26, 2014, Pochner et al.
U.S. Appl. No. 14/225,507, filed Mar. 26, 2014, Jin et al.
U.S. Appl. No. 14/225,516, filed Mar. 26, 2014, Whitney et al.
U.S. Appl. No. 14/225,531, filed Mar. 26, 2014, Genslak et al.
U.S. Appl. No. 14/225,569, filed Mar. 26, 2014, Long et al.
U.S. Appl. No. 14/225,587, filed Mar. 26, 2014, Cygan, Jr. et al.
U.S. Appl. No. 14/225,626, filed Mar. 26, 2014, Verdejo et al.
U.S. Appl. No. 14/225,808, filed Mar. 26, 2014, Whitney et al.
U.S. Appl. No. 14/225,817, filed Mar. 26, 2014, Cygan, Jr. et al.
U.S. Appl. No. 14/225,891, filed Mar. 26, 2014, Genslak et al.
U.S. Appl. No. 14/225,896, filed Mar. 26, 2014, Cygan, Jr. et al.
U.S. Appl. No. 14/226,006, filed Mar. 26, 2014, Pochner et al.
U.S. Appl. No. 14/226,121, filed Mar. 26, 2014, Wong et al.
Kolmanovsky, I., "Towards Engine and Powertrain Control Based on Model Predictive Control," (Sep. 28, 2012), Powerpoint Presentation, 47 slides.

MODEL PREDICTIVE CONTROL SYSTEMS AND METHODS FOR INTERNAL COMBUSTION ENGINES

CROSS-REFERENCE TO RELATED APPLICATIONS

This application is related to U.S. patent application Ser. No. 14/225,516 filed on Mar. 26, 2014, Ser. No. 14/225,569 filed on Mar. 26, 2014, Ser. No. 14/225,626 filed on Mar. 26, 2014, Ser. No. 14/225,817 filed on Mar. 26, 2014, Ser. No. 14/225,896 filed on Mar. 26, 2014, Ser. No. 14/225,531 filed on Mar. 26, 2014, Ser. No. 14/225,507 filed on Mar. 26, 2014, Ser. No. 14/225,808 filed on Mar. 26, 2014, Ser. No. 14/225,587 filed on Mar. 26, 2014, Ser. No. 14/225,492 filed on Mar. 26, 2014, Ser. No. 14/226,006 filed on Mar. 26, 2014, Ser. No. 14/226,121 filed on Mar. 26, 2014, Ser. No. 14/225,496 filed on Mar. 26, 2014, and Ser. No. 14/225,891 filed on Mar. 26, 2014. The entire disclosure of the above applications are incorporated herein by reference.

FIELD

The present disclosure relates to internal combustion engines and more particularly to engine control systems and methods for vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A prediction module generates a first predicted engine output torque and a first predicted mass of air per cylinder (APC) based on a model of the spark ignition engine and a first set of possible target values determined based on an engine torque request and generates a second predicted engine output torque and a second predicted mass of APC based on the model of the spark ignition engine and a second set of possible target values determined based on the engine torque request. A cost module: determines a first cost for the first set of possible target values based on a first predetermined weighting value, the first predicted engine output torque, the engine torque request, a second predetermined weighting value, and the first predicted mass of APC; and determines a second cost for the second set of possible target values based on the first predetermined weighting value, the second predicted engine output torque, the engine torque request, the second predetermined weighting value, and the second predicted mass of APC. A selection module selects one of the first and second sets based on the first and second costs and that sets target values based on the possible target values of the selected one of the first and second sets. A throttle actuator module controls opening of a throttle valve based on a first one of the target values.

In further features: a boost actuator module that controls opening of a wastegate of a turbocharger based on a second one of the target values; an exhaust gas recirculation (EGR) actuator module that controls opening of an EGR valve based on a third one of the target values; and a phaser actuator module that controls intake and exhaust valve phasing based on fourth and fifth ones of the target values.

In still further features, the cost module determines the first cost based on: a first product of the first predetermined weighting value and a magnitude of a first difference between the first predicted engine output torque and the engine torque request; and a second product of the second predetermined weighting value and a second difference between the first predicted mass of APC and a predetermined minimum APC. The cost module determines the second cost based on: a third product of the first weighting value and a magnitude of a third difference between the second predicted engine output torque and the engine torque request; and a fourth product of the second weighting value and a magnitude of a fourth difference between the second predicted mass of APC and the predetermined minimum APC.

In yet further features the cost module: determines the first cost based on a sum of the first and second products; and determines the second cost based on a sum of the third and fourth products.

In further features, the first predetermined weighting value is greater than the second predetermined weighting value.

In still further features, the selection module selects the first set when the first cost is less than the second cost, and the selection module selects the second set when the second cost is less than the first cost.

In yet further features, the cost module: determines the first cost further based on a third predetermined weighting value, a first predicted crankshaft angle where a predetermined percent of injected fuel will be burned, a predetermined minimum crankshaft angle, and a predetermined maximum crankshaft angle; and determines the second cost further based on the third predetermined weighting value, a second predicted crankshaft angle where the predetermined percent of injected fuel will be burned, the predetermined minimum crankshaft angle, and the predetermined maximum crankshaft angle.

In further features, the prediction module further: generates the first predicted crankshaft angle based on the model of the spark ignition engine and the first set of possible target values; and generates the second predicted crankshaft angle based on the model of the spark ignition engine and the second set of possible target values.

In still further features, the cost module: determines the first cost further based on a fourth predetermined weighting value, a first predicted coefficient of variation (COV) of indicated mean effective pressure (IMEP), a predetermined minimum COV of IMEP, and a predetermined maximum COV of IMEP; and determines the second cost further based on the fourth predetermined weighting value, a second predicted COV of IMEP, the predetermined minimum COV of IMEP, and the predetermined maximum COV of IMEP.

In yet further features, the prediction module further: generates the first predicted COV of IMEP based on the model of the spark ignition engine and the first set of possible target values; and generates the second predicted COV of IMEP based on the model of the spark ignition engine and the second set of possible target values.

An engine control method includes: generating a first predicted engine output torque and a first predicted mass of air per cylinder (APC) based on a model of the spark ignition engine and a first set of possible target values determined based on an engine torque request; generating a second predicted engine output torque and a second predicted mass of APC based on the model of the spark ignition engine and a second set of possible target values determined based on the engine torque request; determining a first cost for the first set of possible target values based on a first predetermined weighting value, the first predicted engine output torque, the engine torque request, a second predetermined weighting value, and the first predicted mass of APC; determining a second cost for the second set of possible target values based on the first predetermined weighting value, the second predicted engine output torque, the engine torque request, the second predetermined weighting value, and the second predicted mass of APC; selecting one of the first and second sets based on the first and second costs; setting target values based on the possible target values of the selected one of the first and second sets; and controlling opening of a throttle valve based on a first one of the target values.

In further features, the engine control method further includes: controlling opening of a wastegate of a turbocharger based on a second one of the target values; controlling opening of an exhaust gas recirculation (EGR) valve based on a third one of the target values; and controlling intake and exhaust valve phasing based on fourth and fifth ones of the target values.

In still further features, the engine control method further includes: determining the first cost based on: (i) a first product of the first predetermined weighting value and a magnitude of a first difference between the first predicted engine output torque and the engine torque request; and (ii) a second product of the second predetermined weighting value and a second difference between the first predicted mass of APC and a predetermined minimum APC; and determining the second cost based on: (i) a third product of the first weighting value and a magnitude of a third difference between the second predicted engine output torque and the engine torque request; and (ii) a fourth product of the second weighting value and a magnitude of a fourth difference between the second predicted mass of APC and the predetermined minimum APC.

In yet further features, the engine control method further includes: determining the first cost based on a sum of the first and second products; and determining the second cost based on a sum of the third and fourth products.

In further features, the first predetermined weighting value is greater than the second predetermined weighting value.

In still further features, the engine control method further includes: selecting the first set when the first cost is less than the second cost; and selecting the second set when the second cost is less than the first cost.

In yet further features, the engine control method further includes: determining the first cost further based on a third predetermined weighting value, a first predicted crankshaft angle where a predetermined percent of injected fuel will be burned, a predetermined minimum crankshaft angle, and a predetermined maximum crankshaft angle; and determining the second cost further based on the third predetermined weighting value, a second predicted crankshaft angle where the predetermined percent of injected fuel will be burned, the predetermined minimum crankshaft angle, and the predetermined maximum crankshaft angle.

In yet further features, the engine control method further includes: generating the first predicted crankshaft angle based on the model of the spark ignition engine and the first set of possible target values; and generating the second predicted crankshaft angle based on the model of the spark ignition engine and the second set of possible target values.

In further features, the engine control method further includes: determining the first cost further based on a fourth predetermined weighting value, a first predicted coefficient of variation (COV) of indicated mean effective pressure (IMEP), a predetermined minimum COV of IMEP, and a predetermined maximum COV of IMEP; and determining the second cost further based on the fourth predetermined weighting value, a second predicted COV of IMEP, the predetermined minimum COV of IMEP, and the predetermined maximum COV of IMEP.

In still further features, the engine control method further includes: generating the first predicted COV of IMEP based on the model of the spark ignition engine and the first set of possible target values; and generating the second predicted COV of IMEP based on the model of the spark ignition engine and the second set of possible target values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module (ECM) controls torque output of an engine. More specifically, the ECM controls actuators of the engine based on target values, respectively, based on a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible fuel consumption decreases. Additionally, calibration and design of the individual SISO controllers may be costly and time consuming.

The ECM of the present disclosure generates the target values using model predictive control (MPC). More specifically, the ECM identifies possible sets of target values based on an engine torque request. The ECM determines predicted parameters for each of the possible sets based on the possible sets' target values and a mathematical model of the engine. For example, the ECM determines a predicted engine output torque and a predicted air per cylinder (APC) for each of the possible sets of target values. The ECM may also determine one or more other predicted parameters for each possible set of target values.

The ECM may determine a cost associated with use of each of the possible sets. The cost determined for a possible set increases as a magnitude of a first difference between the predicted engine output torque determined for that possible set and the engine torque request increases and vice versa. The cost also increases as a magnitude of a second difference between the predicted APC determined for that possible set and zero increases and vice versa. The ECM may select the one of the possible sets having the lowest cost. In various implementations, instead of or in addition to identifying possible sets of target values and determining the cost of each of the sets, the ECM may generate a surface representing the cost of possible sets of target values. The ECM may then identify the possible set that has the lowest cost based on the slope of the cost surface.

In this manner, the ECM may select the one of the possible sets that is predicted to most closely track the engine torque request while minimizing the APC. Minimizing the APC may minimize fuel consumption. The ECM sets the target values for controlling the engine actuators using the target values of the selected possible set.

Figure 1:
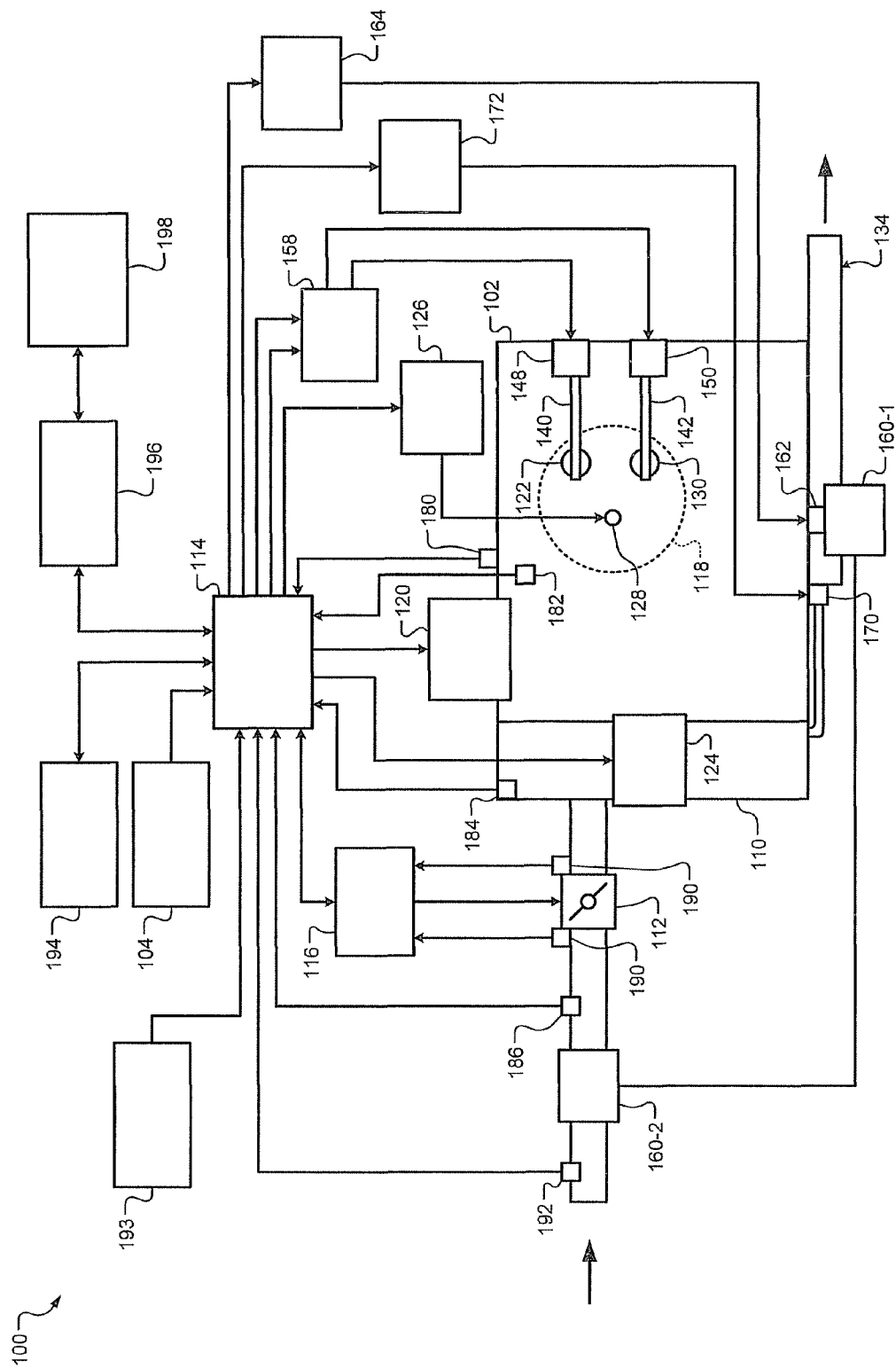
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser

148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
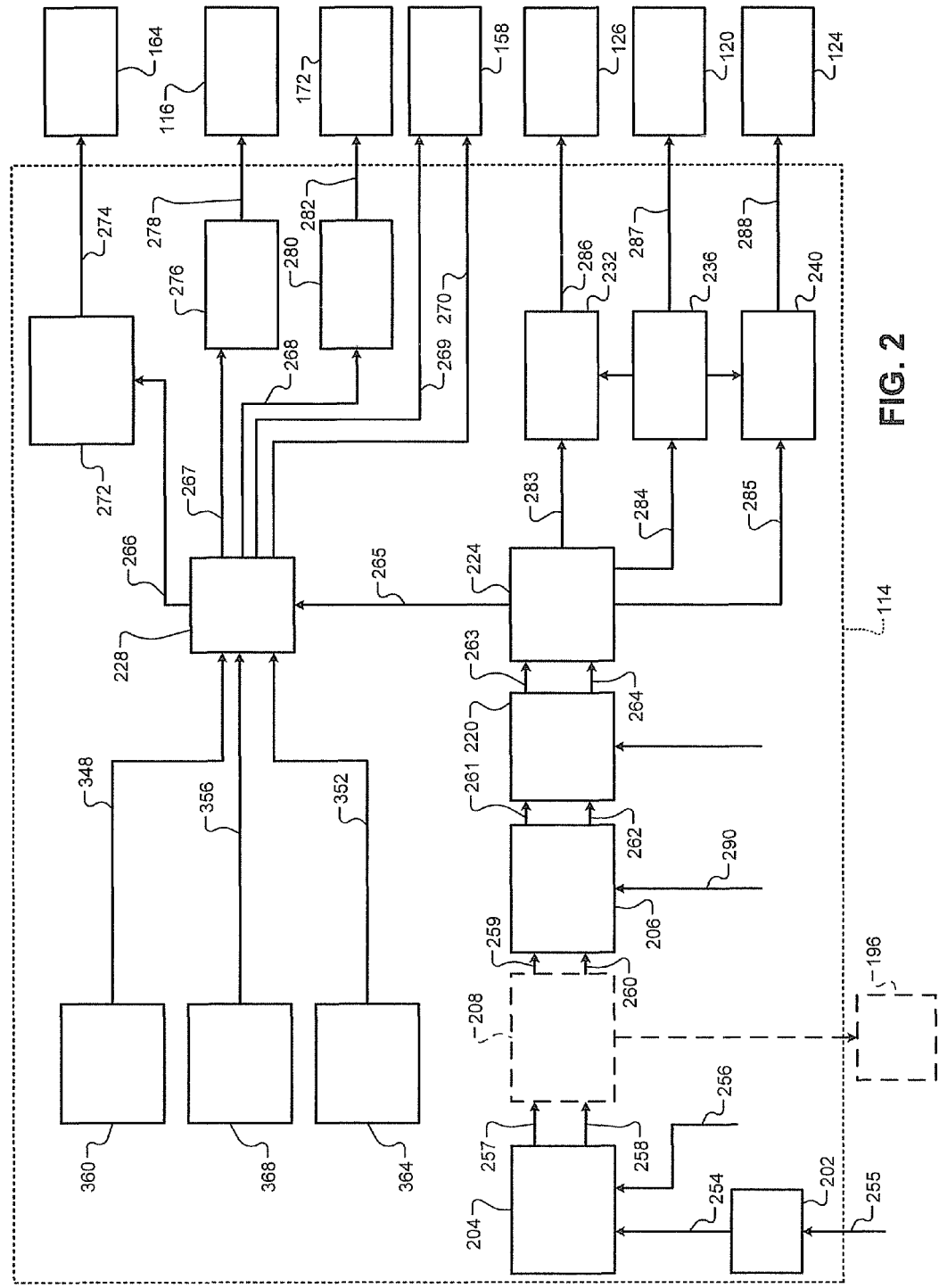
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the engine actuators.

In general terms, the immediate torque request 258 may be an amount of currently desired axle torque, while the predicted torque request 257 may be an amount of axle torque that may be needed on short notice. The ECM 114 controls the engine system 100 to produce an axle torque equal to the immediate torque request 258. However, different combinations of target values may result in the same axle torque. The ECM 114 may therefore adjust the target values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. Fast engine actuators are defined in contrast with slow engine actuators.

In general terms, fast engine actuators can change the axle torque more quickly than slow engine actuators. Slow actuators may respond more slowly to changes in their respective target values than fast actuators do. For example, a slow actuator may include mechanical components that require time to move from one position to another in response to a change in target value. A slow actuator may also be characterized by the amount of time it takes for the axle torque to begin to change once the slow actuator begins to implement the changed target value. Generally, this amount of time will be longer for slow actuators than for fast actuators. In addition, even after beginning to change, the axle torque may take longer to fully respond to a change in a slow actuator.

For example only, the spark actuator module 126 may be a fast actuator. Spark-ignition engines may combust fuels including, for example, gasoline and ethanol, by applying a spark. By way of contrast, the throttle actuator module 116 may be a slow actuator.

For example, as described above, the spark actuator module 126 can vary the spark timing for a next firing event when the spark timing is changed between a last firing event and the next firing event. By way of contrast, changes in throttle opening take longer to affect engine output torque. The throttle actuator module 116 changes the throttle opening by adjusting the angle of the blade of the throttle valve 112. Therefore, when the target value for opening of the throttle valve 112 is changed, there is a mechanical delay as the throttle valve 112 moves from its previous position to a new position in response to the change. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

The torque requesting module 224 determines an air torque request 265 based on the adjusted predicted and immediate torque requests 263 and 264. The air torque request 265 may be a brake torque. Brake torque may refer to torque at the crankshaft under the current operating conditions.

Target values for airflow controlling engine actuators are determined based on the air torque request 265. More specifically, based on the air torque request 265, the air control module 228 determines a target wastegate opening area 266, a target throttle opening area 267, a target EGR opening area 268, a target intake cam phaser angle 269, and a target exhaust cam phaser angle 270. The air control module 228 determines the target wastegate opening area 266, the target throttle opening area 267, the target EGR opening area 268, the target intake cam phaser angle 269, and the target exhaust cam phaser angle 270 using model predictive control, as discussed further below.

The boost actuator module 164 controls the wastegate 162 to achieve the target wastegate opening area 266. For example, a first conversion module 272 may convert the target wastegate opening area 266 into a target duty cycle 274 to be applied to the wastegate 162, and the boost actuator module 164 may apply a signal to the wastegate 162 based on the target duty cycle 274. In various implementations, the first conversion module 272 may convert the target wastegate opening area 266 into a target wastegate position (not shown), and convert the target wastegate position into the target duty cycle 274.

The throttle actuator module 116 controls the throttle valve 112 to achieve the target throttle opening area 267. For example, a second conversion module 276 may convert the target throttle opening area 267 into a target duty cycle 278 to be applied to the throttle valve 112, and the throttle actuator module 116 may apply a signal to the throttle valve 112 based on the target duty cycle 278. In various implementations, the second conversion module 276 may convert the target throttle opening area 267 into a target throttle position (not shown), and convert the target throttle position into the target duty cycle 278.

The EGR actuator module 172 controls the EGR valve 170 to achieve the target EGR opening area 268. For example, a third conversion module 280 may convert the target EGR opening area 268 into a target duty cycle 282 to be applied to the EGR valve 170, and the EGR actuator module 172 may apply a signal to the EGR valve 170 based on the target duty cycle 282. In various implementations, the third conversion module 280 may convert the target EGR opening area 268 into a target EGR position (not shown), and convert the target EGR position into the target duty cycle 282.

The phaser actuator module 158 controls the intake cam phaser 148 to achieve the target intake cam phaser angle 269. The phaser actuator module 158 also controls the exhaust cam phaser 150 to achieve the target exhaust cam phaser angle 270. In various implementations, a fourth conversion module (not shown) may be included and may convert the target intake and exhaust cam phaser angles into target intake and exhaust duty cycles, respectively. The phaser actuator module 158 may apply the target intake and exhaust duty cycles to the intake and exhaust cam phasers 148 and 150, respectively. In various implementations, the air control module 228 may determine a target overlap factor and a target effective displacement, and the phaser actuator module 158 may control the intake and exhaust cam phasers 148 and 150 to achieve the target overlap factor and the target effective displacement.

The torque requesting module 224 may also generate a spark torque request 283, a cylinder shut-off torque request 284, and a fuel torque request 285 based on the predicted and immediate torque requests 263 and 264. The spark control module 232 may determine how much to retard the spark timing (which reduces engine output torque) from an optimum spark timing based on the spark torque request 283. For example only, a torque relationship may be inverted to solve for a target spark timing 286. For a given torque request ($T_{Req}$), the target spark timing ($S_T$) 286 may be determined based on:

$$S_T = f^{-1}(T_{Req}, APC, I, E, AF, OT, \#), \quad (1)$$

where APC is an APC, I is an intake valve phasing value, E is an exhaust valve phasing value, AF is an air/fuel ratio, OT is an oil temperature, and # is a number of activated cylinders. This relationship may be embodied as an equation and/or as a lookup table. The air/fuel ratio (AF) may be the actual air/fuel ratio, as reported by the fuel control module 240.

When the spark timing is set to the optimum spark timing, the resulting torque may be as close to a minimum spark advance for best torque (MBT spark timing) as possible. Best torque refers to the maximum engine output torque that is generated for a given air flow as spark timing is advanced, while using fuel having an octane rating greater than a predetermined octane rating and using stoichiometric fueling. The spark timing at which this best occurs is referred to as an MBT spark timing. The optimum spark timing may differ slightly from MBT spark timing because of, for example, fuel quality (such as when lower octane fuel is used) and environmental factors, such as ambient humidity and temperature. The engine output torque at the optimum spark timing may therefore be less than MBT. For example only, a table of optimum spark timings corresponding to different engine operating conditions may be determined during a calibration phase of vehicle design, and the optimum value is determined from the table based on current engine operating conditions.

The cylinder shut-off torque request 284 may be used by the cylinder control module 236 to determine a target number of cylinders to deactivate 287. In various implementations, a target number of cylinders to activate may be used. The cylinder actuator module 120 selectively activates and deactivates the valves of cylinders based on the target number 287.

The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 285. More specifically, the fuel control module 240 may generate target fueling parameters 288 based on the fuel torque request 285. The target fueling parameters 288 may include, for example, target mass of fuel, target injection starting timing, and target number of fuel injections.

During normal operation, the fuel control module 240 may operate in an air lead mode in which the fuel control module 240 attempts to maintain a stoichiometric air/fuel ratio by controlling fueling based on air flow. For example, the fuel control module 240 may determine a target fuel mass that will yield stoichiometric combustion when combined with a present mass of air per cylinder (APC).

Figure 3:
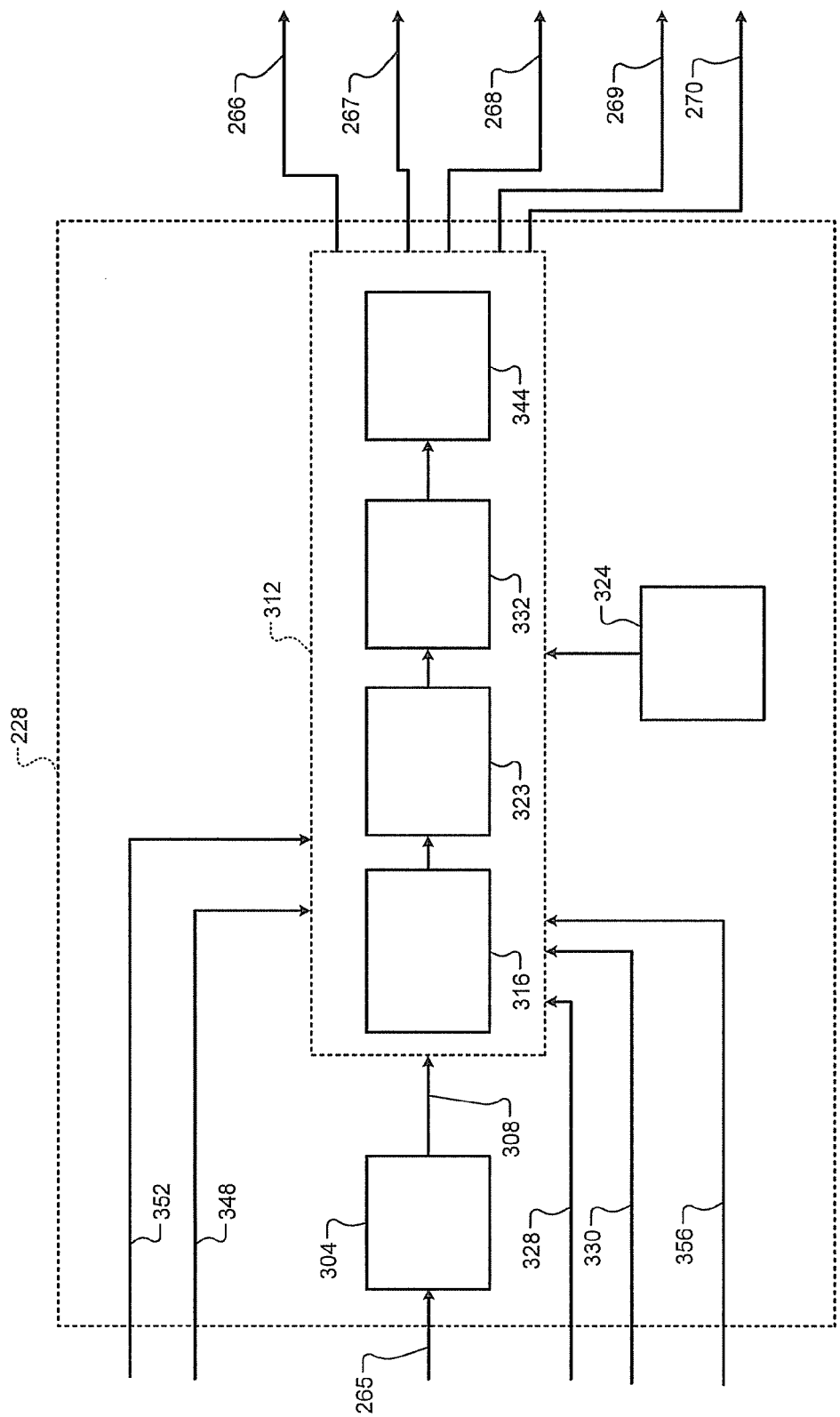
FIG. 3 is a functional block diagram of an example air control module according to the present disclosure.

FIG. 3 is a functional block diagram of an example implementation of the air control module 228. Referring now to FIGS. 2 and 3, as discussed above, the air torque request 265 may be a brake torque. A torque conversion module 304 converts the air torque request 265 from brake torque into base torque. The torque request resulting from conversion into base torque will be referred to as a base air torque request 308.

Base torques may refer to torque at the crankshaft made during operation of the engine 102 on a dynamometer while the engine 102 is warm and no torque loads are imposed on the engine 102 by accessories, such as an alternator and the A/C compressor. The torque conversion module 304 may convert the air torque request 265 into the base air torque request 308, for example, using a mapping or a function that relates brake torques to base torques. In various implementations, the torque conversion module 304 may convert the air torque request 265 into another suitable type of torque, such as an indicated torque. An indicated torque may refer to a torque at the crankshaft attributable to work produced via combustion within the cylinders.

An MPC module 312 generates the target values 266-270 using a MPC (Model Predictive Control) scheme. The MPC module 312 may be a single module or may comprise multiple modules. For example, the MPC module 312 may include a sequence determination module 316. The sequence determination module 316 determines possible sequences of the target values 266-270 that could be used together during N future control loops.

A prediction module 323 determines predicted responses of the engine 102 to the possible sequences of the target values 266-270, respectively, based on a (mathematical) model 324 of the engine 102, exogenous inputs 328, and feedback inputs 330. More specifically, based on a possible sequence of the target values 266-270, the exogenous inputs 328, and the feedback inputs 330, using the model 324, the prediction module 323 generates a sequence of predicted torques of the engine 102 for the N control loops, a sequence of predicted APCs for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops.

The model 324 may be, for example, a function or a mapping calibrated based on characteristics of the engine 102. Dilution may refer to an amount of exhaust from a prior combustion event trapped within a cylinder for a combustion event. External dilution may refer to exhaust provided for a combustion event via the EGR valve 170. Residual dilution (also referred to as internal dilution) may refer to exhaust that remains in a cylinder and/or exhaust that is pushed back into the cylinder following the exhaust stroke of a combustion cycle.

Combustion phasing may refer to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft angle (CA) where 50 percent of a mass of injected fuel has been combusted within a cylinder. The predetermined CA50 may correspond to a CA50 where a maximum amount of work is produced from the fuel injected and may be approximately 8.5-approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

The exogenous inputs 328 may include parameters that are not directly affected by the throttle valve 112, the EGR valve 170, the turbocharger, the intake cam phaser 148, and the exhaust cam phaser 150. For example, the exogenous inputs 328 may include engine speed, turbocharger inlet air pressure, IAT, and/or one or more other parameters. The feedback inputs 330 may include, for example, an estimated torque output of the engine 102, an exhaust pressure downstream of the turbine 160-1 of the turbocharger, the IAT, an APC of the engine 102, an estimated residual dilution, an estimated external dilution, and/or one or more other suitable parameters. The feedback inputs 330 may be measured using sensors (e.g., the IAT) and/or estimated based on one or more other parameters.

Each of the possible sequences identified by the sequence determination module 316 includes one sequence of N values for each of the target values 266-270. In other words, each possible sequence includes a sequence of N values for the target wastegate opening area 266, a sequence of N values for the target throttle opening area 267, a sequence of N values for the target EGR opening area 268, a sequence of N values for the target intake cam phaser angle 269, and a sequence of N values for the target exhaust cam phaser angle 270. Each of the N values are for a corresponding one of the N future control loops. N is an integer greater than or equal to one.

A cost module 332 determines a cost value for each of the possible sequences of the target values 266-270 based on the predicted parameters determined for a possible sequence and output reference values 356. An example cost determination is discussed further below.

A selection module 344 selects one of the possible sequences of the target values 266-270 based on the costs of the possible sequences, respectively. For example, the selection module 344 may select the one of the possible sequences having the lowest cost while satisfying actuator constraints 348 and output constraints 352. In various implementations, the model 324 may select the one of the possible sequences having the lowest cost while satisfying the actuator constraints 348 and the output constraints 352.

In various implementations, satisfaction of the actuator constraints 348 and the output constraints may be considered in the cost determination. In other words, the cost module 332 may determine the cost values further based on the actuator constraints 348 and the output constraints 352. As discussed further below, based on how the cost values are determined, the selection module 344 will select the one of the possible sequences that best achieves the base air torque request 308 while minimizing the APC, subject to the actuator constraints 348 and the output constraints 352.

The selection module 344 may set the target values 266-270 to the first ones of the N values of the selected possible sequence, respectively. In other words, the selection module 344 may set the target wastegate opening area 266 to the first one of the N values in the sequence of N values for the target wastegate opening area 266, set the target throttle opening area 267 to the first one of the N values in the sequence of N values for the target throttle opening area 267, set the target EGR opening area 268 to the first one of the N values in the sequence of N values for the target EGR opening area 268, set the target intake cam phaser angle 269 to the first one of the N values in the sequence of N values for the target intake cam phaser angle 269, and set the target exhaust cam phaser angle 270 to the first one of the N values in the sequence of N values for the target exhaust cam phaser angle 270.

During a next control loop, the MPC module 312 identifies possible sequences, generates the predicted parameters for the possible sequences, determines the cost of each of the possible sequences, selects of one of the possible sequences, and sets of the target values 266-270 to the first set of the target values 266-270 in the selected possible sequence. This process continues for each control loop.

An actuator constraint module 360 (see FIG. 2) sets one of the actuator constraints 348 for each of the target values 266-270. In other words, the actuator constraint module 360 sets an actuator constraint for the throttle valve 112, an actuator constraint for the EGR valve 170, an actuator constraint for the wastegate 162, an actuator constraint for the intake cam phaser 148, and an actuator constraint for the exhaust cam phaser 150.

The actuator constraints 348 for each one of the target values 266-270 may include a maximum value for an associated target value and a minimum value for that target value. The actuator constraint module 360 may generally set the actuator constraints 348 to predetermined operational ranges for the associated actuators. More specifically, the actuator constraint module 360 may generally set the actuator constraints 348 to predetermined operational ranges for the throttle valve 112, the EGR valve 170, the wastegate 162, the intake cam phaser 148, and the exhaust cam phaser 150, respectively.

However, the actuator constraint module 360 may selectively adjust one or more of the actuator constraints 348 under some circumstances. For example, the actuator constraint module 360 may adjust the actuator constraints for a given actuator to narrow the operational range for that engine actuator when a fault is diagnosed in that engine actuator. For another example only, the actuator constraint module 360 may adjust the actuator constraints such that the target value for a given actuator follows a predetermined schedule over time or changes by a predetermined amount, for example, for a fault diagnostic, such as a cam phaser fault diagnostic, a throttle diagnostic, an EGR diagnostic, etc. For a target value to follow a predetermined schedule over time or to change by a predetermined amount, the actuator constraint module 360 may set the minimum and maximum values to the same value. The minimum and maximum values being set to the same value may force the corresponding target value to be set to the same value as the minimum and maximum values. The actuator constraint module 360 may vary the same value to which the minimum and maximum values are set over time to cause the target value to follow a predetermined schedule.

An output constraint module 364 (see FIG. 2) sets the output constraints 352 for the predicted torque output of the engine 102, the predicted CA50, the predicted COV of IMEP, the predicted residual dilution, and the predicted external dilution. The output constraints 352 for each one of the predicted values may include a maximum value for an associated predicted parameter and a minimum value for that predicted parameter. For example, the output constraints 352 may include a minimum torque, a maximum torque, a minimum CA50 and a maximum CA50, a minimum COV of IMEP and a maximum COV of IMEP, a minimum residual dilution and a maximum residual dilution, and a minimum external dilution and a maximum external dilution.

The output constraint module 364 may generally set the output constraints 352 to predetermined ranges for the associated predicted parameters, respectively. However, the output constraint module 364 may vary one or more of the output constraints 352 under some circumstances. For example, the output constraint module 364 may retard the maximum CA50, such as when knock occurs within the engine 102. For another example, the output constraint module 364 may increase the maximum COV of IMEP under low load conditions, such as during engine idling where the a higher COV of IMEP may be needed to achieve a given torque request.

A reference module 368 (see FIG. 2) generates the reference values 356 for the target values 266-270, respectively. The reference values 356 include a reference for each of the target values 266-270. In other words, the reference values 356 include a reference wastegate opening area, a reference throttle opening area, a reference EGR opening area, a reference intake cam phaser angle, and a reference exhaust cam phaser angle.

The reference module 368 may determine the reference values 356, for example, based on the air torque request 265, the base air torque request 308, and/or one or more other suitable parameters. The reference values 356 provide references for setting the target values 266-270, respectively. The reference values 356 may be used to determine the cost values for possible sequences. The reference values 356 may also be used for one or more other reasons, such as by the sequence determination module 316 to determine possible sequences.

Instead of or in addition to generating sequences of possible target values and determining the cost of each of the sequences, the MPC module 312 may identify a sequence of possible target values having the lowest cost using convex optimization techniques. For example, the MPC module 312 may determine the target values 266-270 using a quadratic programming (QP) solver, such as a Dantzig QP solver. In another example, the MPC module 312 may generate a surface of cost values for the possible sequences of the target values 266-270 and, based on the slope of the cost surface, identify a set of possible target values having the lowest cost. The MPC module 312 may then test that set of possible target values to determine whether that set of possible target values will satisfy the actuator constraints 348 and the output constraints 352. The MPC module 312 selects the set of possible target values having the lowest cost while satisfying the actuator constraints 348 and the output constraints 352.

The cost module 332 may determine the cost for the possible sequences of the target values 266-270 based on relationships between: the predicted torque and the base air torque request 308; the predicted APC and zero; the possible target values and the respective actuator constraints 348; the other predicted parameters and the respective output constraints 352; and the possible target values and the respective reference values 356. The relationships may be weighted, for example, to control the effect that each of the relationships has on the cost.

For example only, the cost module 332 may determine the cost for a possible sequence of the target values 266-270 based on the equation:

$$\text{Cost}=\Sigma_{i=1}^{N}\rho\epsilon^2+\|wT^*(TP_i-\text{BATR})\|^2+\|wA^* (\text{APC}P_i-0)\|^2,$$

where Cost is the cost for the possible sequence of the target values 266-270, TPi is the predicted torque of the engine 102 for an i-th one of the N control loops, BATR is the base air torque request 308, and wT is a weighting value associated with the relationship between the predicted and reference engine torques. APCPi is a predicted APC for the i-th one of the N control loops and wA is a weighting value associated with the relationship between the predicted APC and zero.

The cost module 332 may determine the cost for a possible sequence of the target values 266-270 based on the following more detailed equation:

$$\text{Cost}=\Sigma_{i=1}^{N}\rho\epsilon^2+\|wT^*(TP_i-\text{BATR})\|^2+\|wA^* (\text{APC}P_i-0)\|^2\|wTV^*(\text{PTTO}i-\text{TORef})\|^2+\|wWG^* (\text{PTWGO}i-\text{EGORef})\|^2+\|wEGR^*(\text{PTEGRO}i- \text{EGRORef})\|^2+\|wIP^*(\text{PTICP}i-\text{ICPRef})\|^2+\|wEP^* (\text{PTECP}i-\text{ECPRef})\|^2,$$

subject to the actuator constraints 348 and the output constraints 352. Cost is the cost for the possible sequence of the target values 266-270, TPi is the predicted torque of the engine 102 for an i-th one of the N control loops, BATR is the base air torque request 308, and wT is a weighting value associated with the relationship between the predicted and reference engine torques. APCPi is a predicted APC for the i-th one of the N control loops and wA is a weighting value associated with the relationship between the predicted APC and zero.

PTTOi is a possible target throttle opening for the i-th one of the N control loops, TORef is the reference throttle opening, and wTV is a weighting value associated with the relationship between the possible target throttle openings and the reference throttle opening. PTWGOi is a possible target wastegate opening for the i-th one of the N control loops, WGORef is the reference wastegate opening, and wWG is a weighting value associated with the relationship between the possible target wastegate openings and the reference wastegate opening.

PTEGROi is a possible target EGR opening for the i-th one of the N control loops, EGRRef is the reference EGR opening, and wEGR is a weighting value associated with the relationship between the possible target EGR openings and the reference EGR opening. PTICi is a possible target intake cam phaser angle for the i-th one of the N control loops, ICPRef is the reference intake cam phaser angle, and wIP is a weighting value associated with the relationship between the possible target intake cam phaser angle and the reference intake cam phaser angle. PTECi is a possible target exhaust cam phaser angle for the i-th one of the N control loops, ECPRef is the reference exhaust cam phaser angle, and wEP is a weighting value associated with the relationship between the possible target exhaust cam phaser angle and the reference exhaust cam phaser angle.

$\rho$ is a weighting value associated with satisfaction of the output constraints 352. $\epsilon$ is a variable that the cost module 332 may set based on whether the output constraints 352 will be satisfied. For example, the cost module 332 may increase E when a predicted parameter is greater than or less than the corresponding minimum or maximum value (e.g., by at least a predetermined amount). The cost module 332 may set E$\epsilon$ to zero when all of the output constraints 352 are satisfied. $\rho$ may be greater than the weighting value wT, the weighting value WA, and the other weighting values (wTV, wWG, wEGR, wIP, wEP) such that the cost determined for a possible sequence will be large if one or more of the output constraints 352 are not satisfied. This may help prevent selection of a possible sequence where one or more of the output constraints 352 are not satisfied.

The weighting value wT may be greater than the weighting value wA and the weighting values wTV, wWG, wEGR, wIP, and wEP. In this manner, the relationship between the relationship between the predicted engine torque and the base air torque request 308 have a larger effect on the cost and, therefore, the selection of one of the possible sequences as discussed further below. The cost increases as the difference between the predicted engine torque and the base air torque request 308 increases and vice versa.

The weighting value wA may be less than the weighting value wT and greater than the weighting values wTV, wWG, wEGR, wIP, and wEP. In this manner, the relationship between the predicted APC and zero has a large effect on the cost, but less than the relationship between the predicted engine torque and the base air torque request 308. The cost increases as the difference between the predicted APC and zero increases and vice versa. While the example use of zero is shown and has been discussed, a predetermined minimum APC may be used in place of zero.

Determining the cost based on the difference between the predicted APC and zero therefore helps ensure that the APC will be minimized. Decreasing APC decreases fuel consumption as fueling is controlled based on the actual APC to achieve a target air/fuel mixture. As the selection module 344 may select the one of the possible sequences having the lowest cost, the selection module 344 may select the one of the possible sequences that best achieves the base air torque request 308 while minimizing the APC.

The weighting values wTV, wWG, wEGR, wIP, and wEP may be less than all of the other weighting values. In this manner, during steady-state operation, the target values 266-270 may settle near or at the reference values 356, respectively. During transient operation, however, the MPC module 312 may adjust the target values 266-270 away from the reference values 356 in order to achieve the base air torque request 308, while minimizing the APC and satisfying the actuator constraints 348 and the output constraints 352.

In operation, the MPC module 312 may determine the cost values for the possible sequences. The MPC module 312 may then select the one of the possible sequences having the lowest cost. The MPC module 312 may next determine whether the selected possible sequence satisfies the actuator constraints 348. If so, the possible sequence may be used. If not, the MPC module 312 determines, based on the selected possible sequence, a possible sequence that satisfies the actuator constraints 348 and that has the lowest cost. The MPC module 312 may use the possible sequence that satisfies the actuator constraints 348 and that has the lowest cost.

Figure 4:
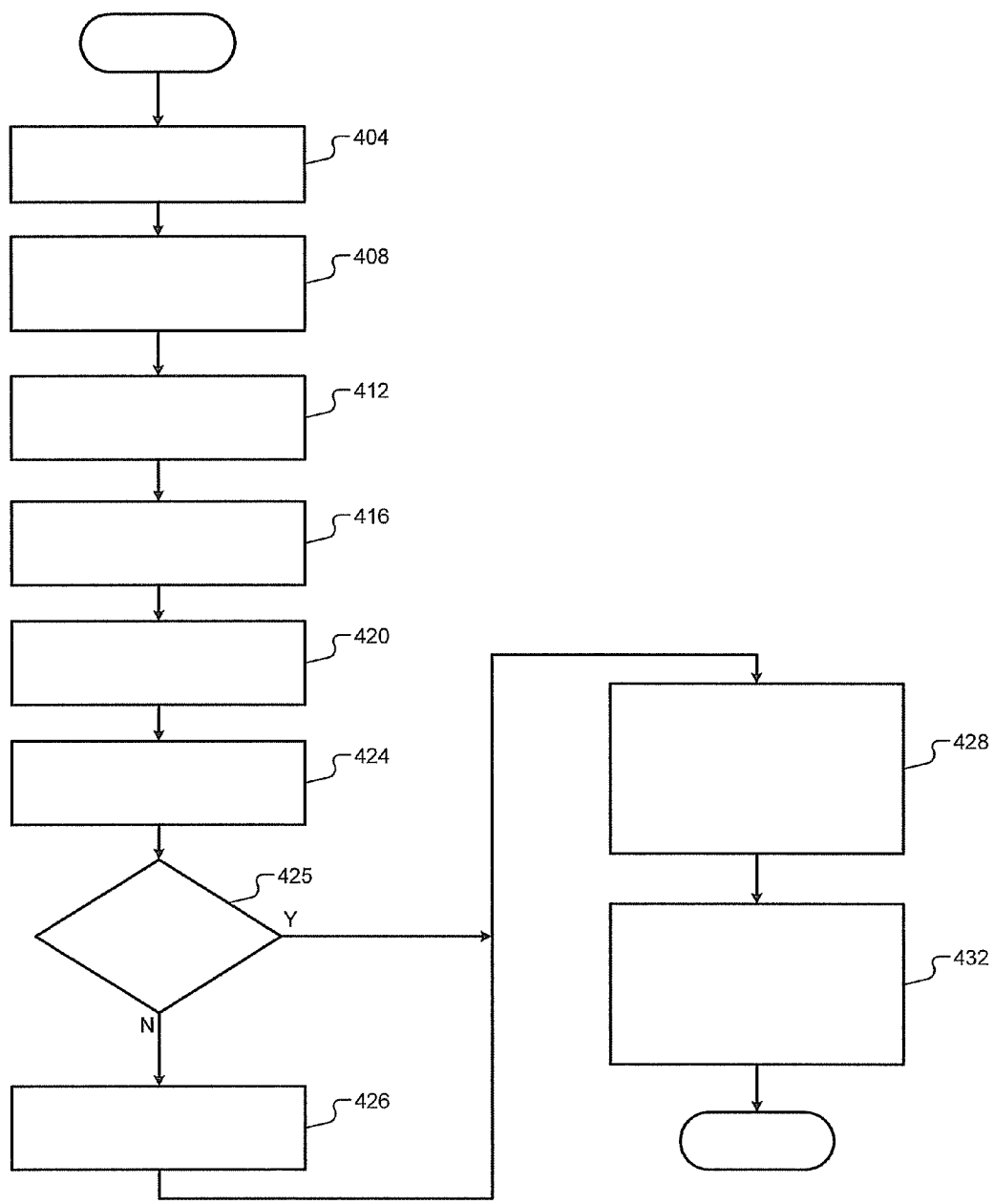
FIG. 4 includes a flowchart depicting an example method of controlling a throttle valve, intake and exhaust valve phasing, a wastegate, and an exhaust gas recirculation (EGR) valve using model predictive control according to the present disclosure.

Referring now to FIG. 4, a flowchart depicting an example method of controlling the throttle valve 112, the intake cam phaser 148, the exhaust cam phaser 150, the wastegate 162 (and therefore the turbocharger), and the EGR valve 170 using MPC (model predictive control) is presented. Control may begin with 404 where the torque requesting module 224 determines the air torque request 265 based on the adjusted predicted and immediate torque requests 263 and 264.

At 408, the torque conversion module 304 may convert the air torque request 265 into the base air torque request 308 or into another suitable type of torque for use by the MPC module 312. The sequence determination module 316 determines possible sequences of the target values 266-270 based on the base air torque request 308 at 412.

At 416, the prediction module 323 determines the predicted parameters for each of the possible sequences of target values. The prediction module 323 determines the predicted parameters for the possible sequences based on the model 324 of the engine 102, the exogenous inputs 328, and the feedback inputs 330. More specifically, based on a possible sequence of the target values 266-270, the exogenous inputs 328, and the feedback inputs 330, using the model 324, the prediction module 323 generates a sequence of predicted torques of the engine 102 for the N control loops, a sequence of predicted APCs for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops.

The cost module 332 determines the costs for the possible sequences, respectively, at 420. For example only, the cost module 332 may determine the cost for a possible sequence of the target values 266-270 based on the equation $$\text{Cost} = \Sigma_{i=1}^{N} \rho \epsilon^2 + \|wT^*(TP_i - \text{BATR})\|^2 + \|wA^* (\text{APC}P_i - 0)\|^2,$$

or based on the equation $$\text{Cost} = \Sigma_{i=1}^{N} \rho \epsilon^2 + \|wT^*(TP_i - \text{BATR})\|^2 + \|wA^* (\text{APC}P_i - 0)\|^2 + \|wTV^*(\text{PTTO}i - \text{TORef})\|^2 + \|wWG^* (\text{PTWGO}i - \text{EGORef})\|^2 + \|wEGR^*(\text{PTEGRO}i - \text{EGRORef})\|^2 + \|wIP^*(\text{PTICP}i - \text{ICPRef})\|^2 + \|wEP^* (\text{PTECP}i - \text{ECPRef})\|^2,$$

subject to the actuator constraints 348 and the output constraints 352, as discussed above.

The selection module 344 selects one of the possible sequences of the target values 266-270 based on the costs of the possible sequences, respectively, at 424. For example, the selection module 344 may select the one of the possible sequences having the lowest cost while satisfying the actuator constraints 348 and the output constraints 352. The selection module 344 may therefore select the one of the possible sequences that best achieves the base air torque request 308 while minimizing the APC and satisfying the output constraints 352. Instead of or in addition to determining possible sequences of the target values 230-244 at 412 and determining the cost of each of the sequences at 420, the MPC module 312 may identify a sequence of possible target values having the lowest cost using convex optimization techniques as discussed above.

The MPC module 312 may determine whether the selected one of the possible sequences satisfies the actuator constraints 348 at 425. If 425 is true, control may continue with 428. If 425 is false, the MPC module 312 may determine, based on the selected possible sequence, a possible sequence that satisfies the actuator constraints 348 and that has the lowest cost at 426, and control may continue with 428. The possible sequence that satisfies the actuator constraints 348 and that has the lowest cost may be used, as discussed below.

At 428, the first conversion module 272 converts the target wastegate opening area 266 into the target duty cycle 274 to be applied to the wastegate 162, the second conversion module 276 converts the target throttle opening area 267 into the target duty cycle 278 to be applied to the throttle valve 112. The third conversion module 280 also converts the target EGR opening area 268 into the target duty cycle 282 to be applied to the EGR valve 170 at 428. The fourth conversion module may also convert the target intake and exhaust cam phaser angles 269 and 270 into the target intake and exhaust duty cycles to be applied to the intake and exhaust cam phasers 148 and 150, respectively.

At 432, the throttle actuator module 116 controls the throttle valve 112 to achieve the target throttle opening area 267, and the phaser actuator module 158 controls the intake and exhaust cam phasers 148 and 150 to achieve the target intake and exhaust cam phaser angles 269 and 270, respectively. For example, the throttle actuator module 116 may apply a signal to the throttle valve 112 at the target duty cycle 278 to achieve the target throttle opening area 267. Also at 432, the EGR actuator module 172 controls the EGR valve 170 to achieve the target EGR opening area 268, and the boost actuator module 164 controls the wastegate 162 to achieve the target wastegate opening area 266. For example, the EGR actuator module 172 may apply a signal to the EGR valve 170 at the target duty cycle 282 to achieve the target EGR opening area 268, and the boost actuator module 164 may apply a signal to the wastegate 162 at the target duty cycle 274 to achieve the target wastegate opening area 266. While FIG. 4 is shown as ending after 432, FIG. 4 may be illustrative of one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system for a vehicle, comprising:
a prediction module that generates a first predicted engine output torque and a first predicted mass of air per cylinder (APC) based on a model of a spark ignition engine and a first set of possible target values determined based on an engine torque request and that generates a second predicted engine output torque and a second predicted mass of APC based on the model of the spark ignition engine and a second set of possible target values determined based on the engine torque request;
a cost module that:
determines a first cost for the first set of possible target values based on a first predetermined weighting value, the first predicted engine output torque, the engine torque request, a second predetermined weighting value, and the first predicted mass of APC; and
determines a second cost for the second set of possible target values based on the first predetermined weighting value, the second predicted engine output torque, the engine torque request, the second predetermined weighting value, and the second predicted mass of APC;
a selection module that selects one of the first and second sets based on the first and second costs and that sets target values based on the possible target values of the selected one of the first and second sets; and
a throttle actuator module that controls opening of a throttle valve based on a first one of the target values.

2. The engine control system of claim 1 further comprising:
a boost actuator module that controls opening of a wastegate of a turbocharger based on a second one of the target values;
an exhaust gas recirculation (EGR) actuator module that controls opening of an EGR valve based on a third one of the target values; and
a phaser actuator module that controls intake and exhaust valve phasing based on fourth and fifth ones of the target values.

3. The engine control system of claim 1 wherein the cost module:
determines the first cost based on:
a first product of the first predetermined weighting value and a magnitude of a first difference between the first predicted engine output torque and the engine torque request; and
a second product of the second predetermined weighting value and a second difference between the first predicted mass of APC and a predetermined minimum APC; and
determines the second cost based on:
a third product of the first weighting value and a magnitude of a third difference between the second predicted engine output torque and the engine torque request; and
a fourth product of the second weighting value and a magnitude of a fourth difference between the second predicted mass of APC and the predetermined minimum APC.

4. The engine control system of claim 3 wherein the cost module:
determines the first cost based on a sum of the first and second products; and
determines the second cost based on a sum of the third and fourth products.

5. The engine control system of claim 3 wherein the first predetermined weighting value is greater than the second predetermined weighting value.

6. The engine control system of claim 1 wherein the selection module selects the first set when the first cost is less than the second cost, and the selection module selects the second set when the second cost is less than the first cost.

7. The engine control system of claim 1 wherein the cost module:
determines the first cost further based on a third predetermined weighting value, a first predicted crankshaft angle where a predetermined percent of injected fuel will be burned, a predetermined minimum crankshaft angle, and a predetermined maximum crankshaft angle; and
determines the second cost further based on the third predetermined weighting value, a second predicted crankshaft angle where the predetermined percent of injected fuel will be burned, the predetermined minimum crankshaft angle, and the predetermined maximum crankshaft angle.

8. The engine control system of claim 7 wherein the prediction module further:
generates the first predicted crankshaft angle based on the model of the spark ignition engine and the first set of possible target values; and
generates the second predicted crankshaft angle based on the model of the spark ignition engine and the second set of possible target values.

9. The engine control system of claim 1 wherein the cost module:
determines the first cost further based on a fourth predetermined weighting value, a first predicted coefficient of variation (COV) of indicated mean effective pressure (IMEP), a predetermined minimum COV of IMEP, and a predetermined maximum COV of IMEP; and
determines the second cost further based on the fourth predetermined weighting value, a second predicted COV of IMEP, the predetermined minimum COV of IMEP, and the predetermined maximum COV of IMEP.

10. The engine control system of claim 9 wherein the prediction module further:
generates the first predicted COV of IMEP based on the model of the spark ignition engine and the first set of possible target values; and
generates the second predicted COV of IMEP based on the model of the spark ignition engine and the second set of possible target values.

11. An engine control method for a vehicle, comprising:
generating a first predicted engine output torque and a first predicted mass of air per cylinder (APC) based on a model of a spark ignition engine and a first set of possible target values determined based on an engine torque request;
generating a second predicted engine output torque and a second predicted mass of APC based on the model of the spark ignition engine and a second set of possible target values determined based on the engine torque request;
determining a first cost for the first set of possible target values based on a first predetermined weighting value, the first predicted engine output torque, the engine torque request, a second predetermined weighting value, and the first predicted mass of APC;
determining a second cost for the second set of possible target values based on the first predetermined weighting value, the second predicted engine output torque, the engine torque request, the second predetermined weighting value, and the second predicted mass of APC;
selecting one of the first and second sets based on the first and second costs;
setting target values based on the possible target values of the selected one of the first and second sets; and
controlling opening of a throttle valve based on a first one of the target values.

12. The engine control method of claim 11 further comprising:
controlling opening of a wastegate of a turbocharger based on a second one of the target values;
controlling opening of an exhaust gas recirculation (EGR) valve based on a third one of the target values; and
controlling intake and exhaust valve phasing based on fourth and fifth ones of the target values.

13. The engine control method of claim 11 further comprising:
determining the first cost based on:
a first product of the first predetermined weighting value and a magnitude of a first difference between the first predicted engine output torque and the engine torque request; and
a second product of the second predetermined weighting value and a second difference between the first predicted mass of APC and a predetermined minimum APC; and
determining the second cost based on:
a third product of the first weighting value and a magnitude of a third difference between the second predicted engine output torque and the engine torque request; and
a fourth product of the second weighting value and a magnitude of a fourth difference between the second predicted mass of APC and the predetermined minimum APC.

14. The engine control method of claim 13 further comprising:
determining the first cost based on a sum of the first and second products; and
determining the second cost based on a sum of the third and fourth products.

15. The engine control method of claim 13 wherein the first predetermined weighting value is greater than the second predetermined weighting value.

16. The engine control method of claim 11 further comprising:
selecting the first set when the first cost is less than the second cost; and
selecting the second set when the second cost is less than the first cost.

17. The engine control method of claim 11 further comprising:
determining the first cost further based on a third predetermined weighting value, a first predicted crankshaft angle where a predetermined percent of injected fuel will be burned, a predetermined minimum crankshaft angle, and a predetermined maximum crankshaft angle; and
determining the second cost further based on the third predetermined weighting value, a second predicted crankshaft angle where the predetermined percent of injected fuel will be burned, the predetermined minimum crankshaft angle, and the predetermined maximum crankshaft angle.

18. The engine control method of claim 17 further comprising:
generating the first predicted crankshaft angle based on the model of the spark ignition engine and the first set of possible target values; and generating the second predicted crankshaft angle based on the model of the spark ignition engine and the second set of possible target values.

19. The engine control method of claim 11 further comprising:
    determining the first cost further based on a fourth predetermined weighting value, a first predicted coefficient of variation (COV) of indicated mean effective pressure (IMEP), a predetermined minimum COV of IMEP, and a predetermined maximum COV of IMEP; and
    determining the second cost further based on the fourth predetermined weighting value, a second predicted COV of IMEP, the predetermined minimum COV of IMEP, and the predetermined maximum COV of IMEP.

20. The engine control method of claim 19 further comprising:
    generating the first predicted COV of IMEP based on the model of the spark ignition engine and the first set of possible target values; and
    generating the second predicted COV of IMEP based on the model of the spark ignition engine and the second set of possible target values.

\* \* \* \* \*